(12) United States Patent
Hu et al.

(10) Patent No.: US 10,685,206 B2
(45) Date of Patent: Jun. 16, 2020

(54) DISPLAY APPARATUS WITH FINGERPRINT IDENTIFICATION DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Weipin Hu, Beijing (CN); Qianqian Bu, Beijing (CN); Yun Qiu, Beijing (CN); Xiao Sun, Beijing (CN); Congcong Wei, Beijing (CN); Mingxiao Jiang, Beijing (CN); Chun Wang, Beijing (CN); Hui Zhang, Beijing (CN); Yang You, Beijing (CN); Sha Liu, Beijing (CN); Ruizhi Yang, Beijing (CN); Lianjie Qu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 87 days.

(21) Appl. No.: 16/118,183

(22) Filed: Aug. 30, 2018

(65) Prior Publication Data
US 2020/0160023 A1     May 21, 2020

(30) Foreign Application Priority Data
Jan. 30, 2018    (CN) .......................... 2018 1 0093521

(51) Int. Cl.
*G06K 9/00*     (2006.01)
*G02F 1/1335*    (2006.01)
(Continued)

(52) U.S. Cl.
CPC .......... *G06K 9/0004* (2013.01); *G02B 1/005* (2013.01); *G02F 1/13725* (2013.01); *G02F 1/133528* (2013.01)

(58) Field of Classification Search
CPC ................. G02B 1/005; G02F 1/13725; G02F 1/133528; G06K 9/0004
See application file for complete search history.

(56) References Cited

U.S. PATENT DOCUMENTS 6,996,319 B2   2/2006   Noda et al.
7,920,728 B2   4/2011   Chen
(Continued)

FOREIGN PATENT DOCUMENTS

CN    1214453 A    4/1999
CN    1643415 A    7/2005
(Continued)

OTHER PUBLICATIONS

Office Action issued in corresponding Chinese Patent Application No. 201810093521.4, dated Feb. 3, 2020.

*Primary Examiner* — Utpal D Shah
(74) *Attorney, Agent, or Firm* — McDermott Will & Emery LLP

(57) ABSTRACT

A display apparatus includes a display panel including a first sub-pixel and a second sub-pixel adjacent to the first sub-pixel; a first fingerprint identification device including a first photosensitive element, an orthographic projection of the first photosensitive element on the display panel being located within the first sub-pixel; and a fingerprint identification anti-interference structure on a light exiting side of the display panel. The fingerprint identification anti-interference structure is configured to shield the first photosensitive element from light emitted from the second sub-pixel and reflected by a fingerprint.

20 Claims, 10 Drawing Sheets

(51) Int. Cl.
*G02F 1/137* (2006.01)
*G02B 1/00* (2006.01)

(56) References Cited

U.S. PATENT DOCUMENTS

| | | | |
|---|---|---|---|
| 2005/0147371 A1 | 7/2005 | Noda et al. | |
| 2017/0147865 A1* | 5/2017 | Jensen | G06K 9/00053 |
| 2017/0317747 A1* | 11/2017 | Xu | H04B 10/07953 |
| 2018/0166018 A1* | 6/2018 | Yang | H01L 27/32 |
| 2018/0190190 A1* | 7/2018 | Xi | G09G 3/3225 |
| 2018/0373361 A1* | 12/2018 | Her | G06F 3/044 |
| 2019/0129238 A1* | 5/2019 | Wang | G02F 1/133512 |
| 2019/0294846 A1* | 9/2019 | Li | G06F 3/0412 |
| 2019/0340408 A1* | 11/2019 | Yang | G06F 3/0412 |

FOREIGN PATENT DOCUMENTS

| | | |
|---|---|---|
| CN | 1916671 A | 2/2007 |
| CN | 103885233 A | 6/2014 |
| CN | 105762173 A | 7/2016 |
| CN | 106773229 A | 5/2017 |
| CN | 106940488 A | 7/2017 |
| CN | 107062574 A | 8/2017 |
| CN | 107066976 A | 8/2017 |
| CN | 206421114 U | 8/2017 |

* cited by examiner

US 10,685,206 B2

DISPLAY APPARATUS WITH FINGERPRINT IDENTIFICATION DEVICE

CROSS-REFERENCE TO RELATED APPLICATION

This application claims the benefit of Chinese Patent Application No. 201810093521.4 filed on Jan. 30, 2018 in the State Intellectual Property Office of China, the whole disclosure of which is incorporated herein by reference.

TECHNICAL FIELD

The present disclosure relates to the field of display technologies, and in particular, to a display apparatus with a fingerprint identification device.

BACKGROUND

In a display apparatus, an optical fingerprint identification technology may be used for fingerprint identification. An identification principle for the optical fingerprint identification technology may include: when a pixel unit emits light, optical signals reflected by a fingerprint of a user are detected and current signals are generated according to the optical signals by means of a fingerprint detector, so as to identify a fingerprint pattern according to the current signals.

However, an accuracy of existing fingerprint identification needs to be improved.

SUMMARY

In an aspect, it is provided a display apparatus including: a display panel including a first sub-pixel and a second sub-pixel adjacent to the first sub-pixel; a first fingerprint identification device including a first photosensitive element, an orthographic projection of the first photosensitive element on the display panel being located within the first sub-pixel; and a fingerprint identification anti-interference structure on a light exiting side of the display panel. The fingerprint identification anti-interference structure is configured to shield the first photosensitive element from light emitted from the second sub-pixel and reflected by a fingerprint.

Optionally, the fingerprint identification anti-interference structure includes a guest-host effect cell and a polarizer on a side of the guest-host effect cell facing away from the display panel, and the guest-host effect cell includes:

a first substrate and a second substrate opposite to each other;

liquid crystal molecules between the first substrate and the second substrate;

dye molecules between the first substrate and the second substrate;

a plurality of first electrodes on the first substrate, the plurality of first electrodes being insulated from each other; and at least one second electrode on the second substrate.

Optionally, the dye molecules are dichroic dye molecules.

Optionally, the guest-host effect cell further includes: a first alignment layer on a side of the first substrate facing towards the second substrate; and a second alignment layer on a side of the second substrate facing towards the first substrate; and alignment directions of both the first alignment layer and the second alignment layer are perpendicular to an absorption axis of the polarizer.

Optionally, the fingerprint identification anti-interference structure includes a first photonic crystal structure, the first photonic crystal structure having a periodic structure in which photonic band gaps are generated in both a first direction and a second direction.

Optionally, the first photonic crystal structure includes:
a substrate formed of a first medium; and
a plurality of holes in the substrate, the plurality of holes being spaced apart and evenly distributed in the substrate in both the first direction and the second direction, the plurality of holes being filled with a second medium different from the first medium.

Optionally, the first photonic crystal structure includes:
a substrate formed of a first medium; and
a plurality of pillars on the substrate, the plurality of pillars being spaced apart and evenly distributed on the substrate in both the first direction and the second direction, the plurality of pillars being formed of the first medium.

Optionally, the fingerprint identification anti-interference structure includes a second photonic crystal structure, the second photonic crystal structure having a structure that allows light within a predetermined frequency range to be transmitted in a third direction.

Optionally, the second photonic crystal structure includes a first photonic crystal unit for allowing light of a first color to be transmitted through the first photonic crystal unit, a second photonic crystal unit for allowing light of a second color to be transmitted through the second photonic crystal unit, and a third photonic crystal unit for allowing light of a third color to be transmitted through the third photonic crystal unit.

Optionally, each of the first photonic crystal unit, the second photonic crystal unit and the third photonic crystal unit includes:

a first portion having a first material layer and a second material layer alternately arranged in the third direction, the first material layer and the second material layer having different refractive indices;

a second portion having a first material layer and a second material layer alternately arranged in the third direction; and a defective layer between the first portion and the second portion.

Optionally, thicknesses of the defective layer of the first photonic crystal unit, the defective layer of the second photonic crystal unit and the defective layer of the third photonic crystal unit are different from each other; or refractive indices of the defective layer of the first photonic crystal unit, the defective layer of the second photonic crystal unit and the defective layer of the third photonic crystal unit are different from each other.

Optionally, the display panel further includes a third sub-pixel adjacent to the first sub-pixel, the first sub-pixel emitting light of the first color, the second sub-pixel emitting light of the second color, and the third sub-pixel emitting light of the third color, and an orthographic projection of the first photonic crystal unit on the display panel at least partially coincides with the first sub-pixel, an orthographic projection of the second photonic crystal unit on the display panel at least partially coincides with the second sub-pixel, and an orthographic projection of the third photonic crystal unit on the display panel at least partially coincides with the third sub-pixel.

Optionally, the first photosensitive element is configured to sense visible light, and the orthographic projection of the first photosensitive element on the display panel does not coincide with a light emitting region of the first sub-pixel.

Optionally, the first photosensitive element is configured to sense non-visible light, and the orthographic projection of the first photosensitive element on the display panel at least partially coincides with a light emitting region of the first sub-pixel.

Optionally, the first photosensitive element is configured to sense non-visible light, and the orthographic projection of the first photosensitive element on the display panel at least partially coincides with a light emitting region of the first sub-pixel on the display panel.

Optionally, the display apparatus further includes: a second fingerprint identification device including a second photosensitive element, an orthographic projection of the second photosensitive element on the display panel being located within the second sub-pixel; and a third fingerprint identification device including a third photosensitive element, an orthographic projection of the third photosensitive element on the display panel being located within the third sub-pixel, the first photosensitive element is configured to sense light of the first color, the second photosensitive element is configured to sense light of the second color, and the third photosensitive element is configured to sense light of the third color.

Optionally, the first photosensitive element includes a photodiode, and the fingerprint identification device further includes a thin film transistor configured to read a signal generated by the photodiode.

Optionally, the first fingerprint identification device is located on the display panel or on the fingerprint identification anti-interference structure.

Optionally, the display panel is an OLED display panel.

Optionally, the display apparatus further includes a touch structure on the light exiting side of the display panel.

BRIEF DESCRIPTION OF THE DRAWINGS

In order to describe technical solutions of the present disclosure more clearly, accompanying drawings to be used in embodiments of the present disclosure will be briefly described below. Obviously, the accompanying drawings are used to illustrate only a part of the embodiments of the present disclosure. Other drawings can be obtained by those skilled in the art without any inventive effort based on these accompanying drawings.

DETAILED DESCRIPTION OF PREFERRED EMBODIMENTS

The technical solutions in embodiments of the present disclosure are clearly and completely described below with reference to accompanying drawings in the embodiments of the present disclosure. It is obvious that the described embodiments are only a part of the embodiments of the present disclosure, and not all of the embodiments. All other embodiments which are obtained by a person of ordinary skill in the art based on the embodiments of the present disclosure without creative works fall within the scope of the disclosure.

A fingerprint is an innate and unique feature of the human body. The fingerprint consists of a series of ridges and valleys on the skin surface. The details of these ridges and valleys determine the uniqueness of the fingerprint. Fingerprint identification technologies may include a photosensitive fingerprint identification technology and a capacitive fingerprint identification technology. In the photosensitive fingerprint identification technology, light emitted from a light source in a display panel irradiates onto the touch body (e.g., a finger) and is reflected by the finger to form reflected light, then the reflected light (i.e., the fingerprint signal light) is transmitted to a fingerprint identification device. The fingerprint identification device acquires optical signals incident thereon. Due to a specific pattern of the fingerprint, intensities of the reflected light are different at various positions of the finger, and finally the optical signals acquired by the fingerprint identification device are different, so that the fingerprint of the user may be identified.

Currently, the fingerprint identification technology may be integrated into a display apparatus, that is, the fingerprint identification device is integrated into the display apparatus. The inventors have found that sources of light which are received by a fingerprint detector of the fingerprint identification device in the display apparatus are relatively complicated, so that it is difficult to determine which portions of a current signal generated by the fingerprint detector are generated due to the reflection by the fingerprint corresponding to the fingerprint detector. Thus, it is difficult to perform accurate fingerprint identification.

Figure 1:
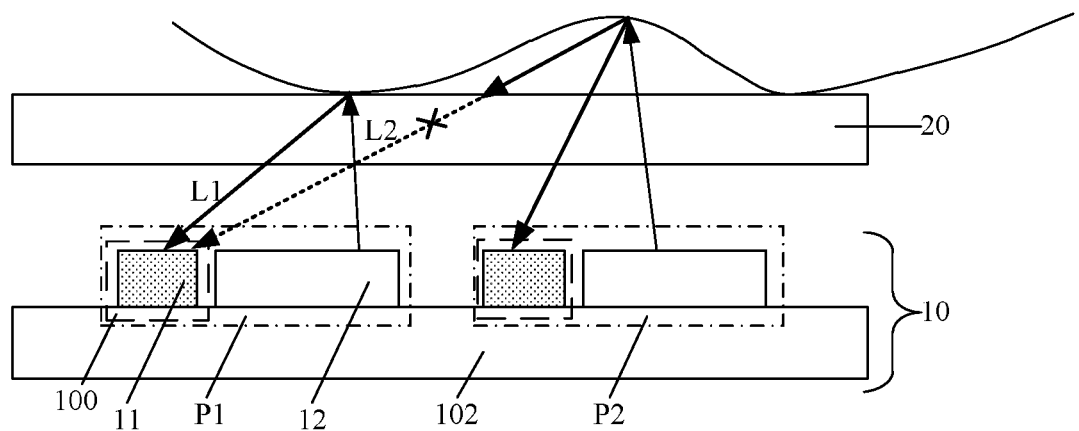
FIG. 1 is a schematic structural view of a display apparatus according to an embodiment of the present disclosure, in which a fingerprint identification device is disposed on a display panel of the display apparatus.
Figure 2:
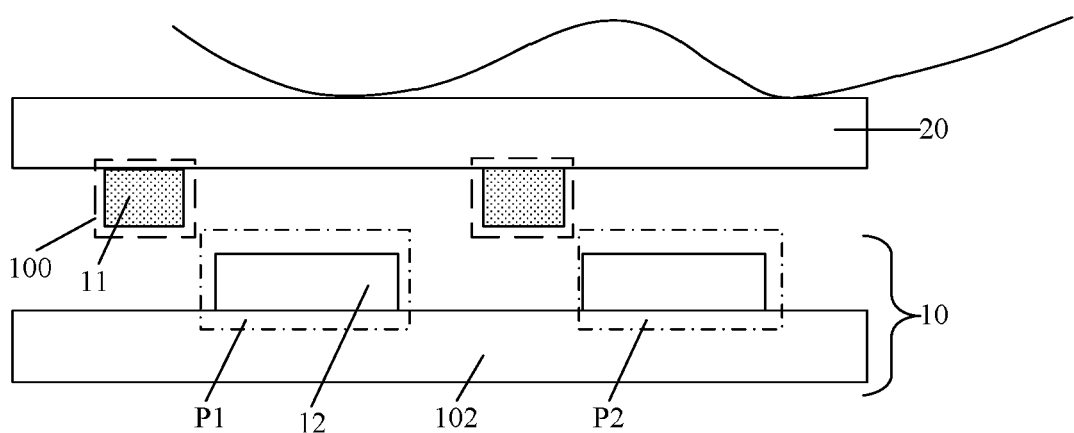
FIG. 2 is a schematic structural view of a display apparatus according to an embodiment of the present disclosure, in which a fingerprint identification device is disposed on a fingerprint identification anti-interference structure of the display apparatus.

FIG. 1 and FIG. 2 schematically illustrate a display apparatus according to an embodiment of the present disclosure. As shown, the display apparatus may include: a display panel 10; a fingerprint identification device 100; and a fingerprint identification anti-interference structure 20. As shown in FIG. 1, the fingerprint identification device 100 may be disposed on the display panel 10. Alternatively, as shown in FIG. 2, the fingerprint identification device 100 may be disposed on the fingerprint identification anti-interference structure 20. The display panel 10 and the fingerprint identification anti-interference structure 20 may be aligned and assembled with each other to form the display apparatus. For example, the fingerprint identification anti-interference structure 20 may be bonded to the display panel 10 by an adhesive or the like to form the display apparatus.

The fingerprint identification device 100 may include a photosensitive element 11, such as a photodiode, for identifying the fingerprint based on light reflected onto the photosensitive element 11 by a touch body (e.g., a finger). The light reflected by a finger is also referred to as fingerprint-reflected light herein.

The fingerprint identification device 100 may be provided in each sub-pixel of the display panel 100. Of course, it may also be reasonably provided according to an actual situation.

Besides the photosensitive element 11, the fingerprint identification device 100 may further include an auxiliary circuit for generating an identifiable signal (e.g., an electrical signal) based on the fingerprint-reflected light received by the photosensitive element 11 and outputting the signal. Since intensities of light reflected by ridges and valleys of the fingerprint are different, the signal which is generated based on the light reflected by the ridge and received by the photosensitive element 11 is different from the signal which is generated based on the light reflected by the valley and received by the photosensitive element 11, thereby identifying the ridges and the valleys of the fingerprint.

As shown, the fingerprint identification anti-interference structure 20 is disposed on a light exiting side of the display panel 10, in order to prevent a mutual interference of the fingerprint-reflected light from adjacent sub-pixels.

Specifically, as shown in FIG. 1 and FIG. 2, the fingerprint identification devices located in two sub-pixels are schematically illustrated. For convenience of description, a sub-pixel located on the left side is referred to as a first sub-pixel P1 while the sub-pixel located on the right side is referred to as a second sub-pixel P2. The photosensitive element 11 located in the first sub-pixel P1 receives only the light reflected by the fingerprint which is directly above the first sub-pixel P1, as indicated by the solid line L1 with an arrow in FIG. 1. If the light reflected by the fingerprint which is directly above the adjacent second sub-pixel P2 is directed to the first sub-pixel P1, as indicated by the dotted line L2 with an arrow in FIG. 1, it may be blocked by the fingerprint identification anti-interference structure 20. In other words, the light reflected by the fingerprint which is directly above the second sub-pixel P2 cannot be received by the photosensitive element 11 located in the first sub-pixel P1. In this manner, the fingerprint identification anti-interference structure 20 may prevent the mutual interference of the fingerprint-reflected light from the adjacent sub-pixels. A specific structure of the fingerprint identification anti-interference structure 20 will be described in more detail below.

Figure 3:
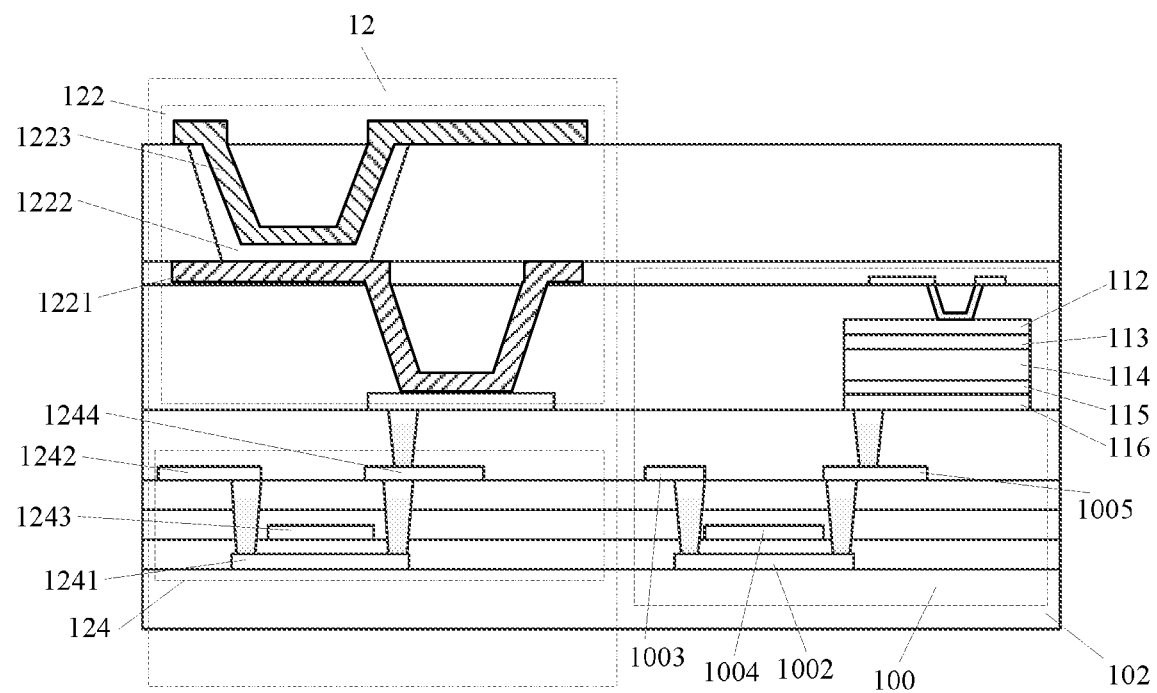
FIG. 3 is a cross-sectional view showing a structure of one sub-pixel of a display apparatus according to an embodiment of the present disclosure.

For example, the display apparatus according to an embodiment of the present disclosure may be a liquid crystal display apparatus, or may be an OLED display apparatus or a QLED display apparatus, and FIG. 3 illustrates a cross-sectional view of a display panel of a display apparatus according to an embodiment of the present disclosure, in which an OLED display apparatus is shown as an example of the display apparatus and only a structure of one sub-pixel is shown.

Referring to FIG. 1 and FIG. 3, the display panel 10 may include a base substrate 102, a display unit 12 disposed on the base substrate 102, and a fingerprint identification device 100 disposed on the base substrate 102.

In the illustrated embodiment, the display unit 12 is an OLED display unit. The display unit 12 may include an organic light emitting unit 122 and a display driving unit 124 which is electrically coupled to the organic light emitting unit 122 and configured to drive the organic light emitting unit 122 to perform light emitting display.

Optionally, the organic light emitting unit 122 may include an anode 1221, a cathode 1223, and a light emitting layer 1222 between the anode 1221 and the cathode 1223. For example, the OLED display unit may be a top emission type OLED display unit, the anode 1221 may be a reflective electrode made of metal, and the cathode 1223 may be a transparent electrode.

Optionally, the display driving unit 124 may include a first thin film transistor. The first thin film transistor may include a first active layer 1241, a first source electrode 1242, a first gate electrode 1243, and a first drain electrode 1244. The first drain electrode 1244 may be electrically coupled to the anode 1221 of the organic light emitting unit 122 for driving the organic light emitting unit 122 to perform light emitting display.

In the illustrated embodiment, the fingerprint identification device 100 may include a photosensitive element 11 and an auxiliary circuit which is configured to generate an identifiable electrical signal based on the fingerprint-reflected light received by the photosensitive element 11 and output the electrical signal.

Optionally, the photosensitive element 11 may be a photodiode, such as a PIN photodiode or an MSM photodiode. For example, as shown in FIG. 3, the photosensitive element 11 is a PIN photodiode, the PIN photodiode may include a first electrode 112, a second electrode 116, as well as a P-type layer 113, an I-type layer 114 and an N-type layer 115 which are located between the first electrode 112 and the second electrode 116.

Optionally, the auxiliary circuit may include a second thin film transistor. The second thin film transistor may include a second active layer 1002, a second source electrode 1003, a second gate electrode 1004, and a second drain electrode 1005. The second drain electrode 1005 may be electrically coupled to the second electrode 116 of the PIN photodiode so as to output an electrical signal. For example, when the fingerprint-reflected light irradiates onto the PIN photodiode, a saturated reverse leakage current of the PIN photodiode is greatly increased to form a photocurrent, and the photocurrent changes as an intensity of the fingerprint-reflected light changes, and the second thin film transistor may output a photocurrent signal to a signal line, thereby performing the fingerprint identification based on the photocurrent signal.

Optionally, the photosensitive element 11 of the fingerprint identification device 100 may be a photosensitive element capable of sensing visible light. The organic light emitting unit 122 of the display unit 12 may also serve as a light source for the fingerprint identification device 100, and the fingerprint identification device 100 may be configured to identify the fingerprint based on the light which is emitted from the organic light emitting unit 122 of the display unit 12 and reflected onto the photosensitive element 11 by the touch body. In this case, it is not necessary to provide an additional light source for the fingerprint identification device 100.

Referring to FIGS. 1, 2 and 3, an orthographic projection of the fingerprint identification device 100 on the base substrate 102 does not coincide with an orthographic projection of the display unit 12 on the base substrate 102, in particular, an orthographic projection of the photosensitive element 11 of the fingerprint identification device 100 on the base substrate 102 does not coincide with an orthographic projection of a light emitting region of the display unit 12 on the base substrate 102, such that light emitted by the display unit 12 during normal display is not directly incident onto the photosensitive element 11 of the fingerprint identification device 100, so as not to interfere with the fingerprint identification function.

In the embodiment, the photosensitive element 11 may be disposed in a non-light emitting region of the display unit 12 and may be formed of an opaque photosensitive material.

Figure 4:
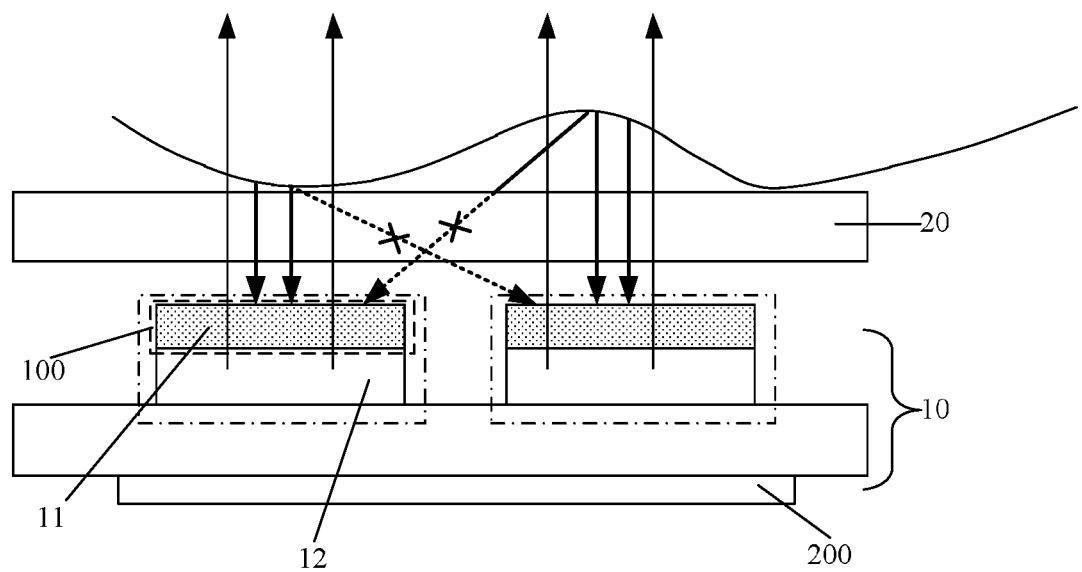
FIG. 4 is a schematic structural view of a display apparatus according to an embodiment of the present disclosure.

Alternatively, the photosensitive element 11 of the fingerprint identification device 100 may be a photosensitive element capable of sensing non-visible light, for example, a photosensitive element capable of sensing infrared light. A light source for fingerprint identification may be additionally provided in the display apparatus, as shown in FIG. 4, a light source 200 for emitting non-visible light such as infrared light is disposed on the base substrate 102, so that the fingerprint-reflected light may include non-visible light. In this case, the photosensitive element 11 is formed of a photosensitive material sensitive to non-visible light, and the visible light emitted by the display unit 12 during normal display does not affect the photosensitive element 11. Thus, as shown in FIG. 4, an orthographic projection of the fingerprint identification device 100 on the base substrate 102 may at least partially coincide with an orthographic projection of the display unit 12 on the base substrate 102, in particular, an orthographic projection of the photosensitive element 11 of the fingerprint identification device 100 on the base substrate 102 may at least partially coincide with an orthographic projection of the light emitting region of the display unit 12 on the base substrate 102. For example, in the illustrated embodiment, the orthographic projection of the photosensitive element 11 of the fingerprint identification device 100 on the base substrate 102 may fully coincide with the orthographic projection of the light emitting region of the display unit 12 on the base substrate 102.

It should be noted that in the case where the photosensitive element 11 of the fingerprint identification device 100 is a photosensitive element capable of sensing non-visible light, a light source for fingerprint identification may not be additionally provided in the display apparatus. For example, the photosensitive element 11 may be a photosensitive element capable of sensing infrared light, in particular, the photosensitive element 11 may sense infrared light emitted from the finger itself to perform fingerprint identification.

Figure 5:
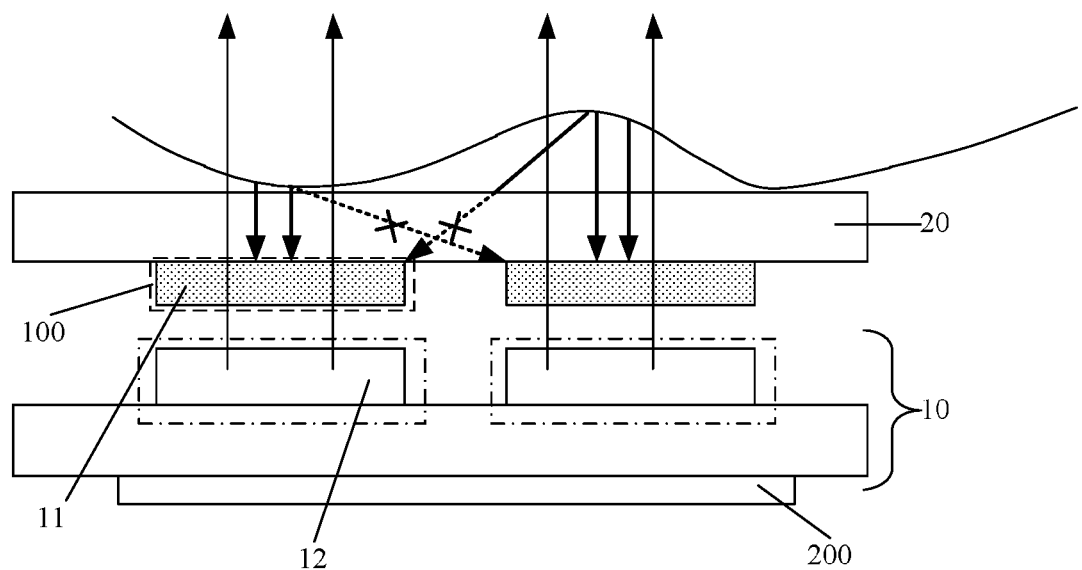
FIG. 5 is a schematic structural view of a display apparatus according to an embodiment of the present disclosure.

Alternatively, as shown in FIG. 5, the fingerprint identification device 100 may be disposed on the fingerprint identification anti-interference structure 20. In this case, the orthographic projection of the fingerprint identification device 100 on the base substrate 102 may also at least partially coincide with the orthographic projection of the display unit 12 on the base substrate 102.

In the embodiment, the photosensitive element 11 is disposed in the light emitting region of the display unit 12 and formed of a transparent photosensitive material.

In the embodiments shown in FIG. 4 and FIG. 5, the display apparatus also includes the fingerprint identification anti-interference structure 20 disposed on the light exiting side of the display panel 10 for preventing a mutual interference of the fingerprint-reflected light from the adjacent sub-pixels.

It should be noted that the display panel 10 may be other types of display panels, such as a liquid crystal display panel. The display unit 12 may include a pixel electrode, a common electrode, an insulating layer, a color filter layer, and a driving circuit.

Hereinafter, the fingerprint identification anti-interference structure 20 will be described in detail with reference to the accompanying drawings.

Figure 6:
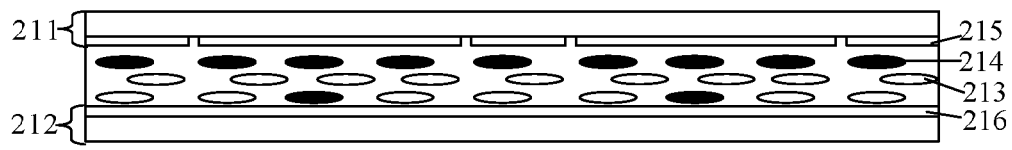
FIG. 6 is a schematic view of a guest-host effect cell of a fingerprint identification anti-interference structure according to an embodiment of the present disclosure.

According to an embodiment of the present disclosure, as shown in FIG. 6, the fingerprint identification anti-interference structure 20 may include a guest-host effect cell 21. Specifically, the guest-host effect cell 21 includes a first substrate 211 and a second substrate 212 disposed opposite to each other, and liquid crystal molecules 213 and dye molecules 214 disposed between the first substrate 211 and the second substrate 212. A plurality of first electrodes 215 insulated from each other are provided on the first substrate 211, and at least one second electrode 216 is provided on the second substrate 212. Dye molecules 214 may specifically be dichroic dye molecules 214.

Figure 7:
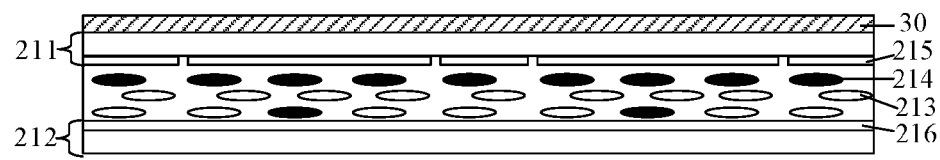
FIG. 7 is a schematic structural view of a display apparatus according to an embodiment of the present disclosure.
Figure 7:
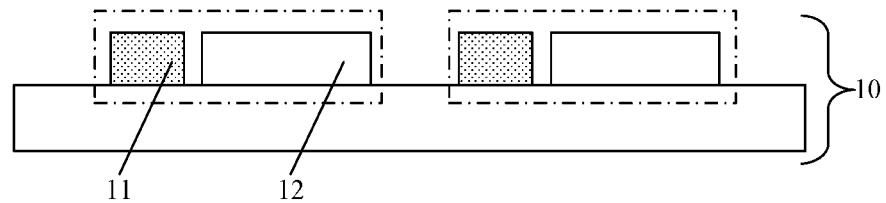

Further, as shown in FIG. 7, the fingerprint identification anti-interference structure 20 further includes a polarizer 30 disposed on a side of the guest-host effect cell 21 facing away from the display panel 10.

The so-called guest-host effect means that under an action of an electric field, the liquid crystal molecules 213 (host) are deflected by a certain angle, and the dichroic dye molecules 214 (guest) will be deflected by a corresponding angle as the liquid crystal molecules 213 (host) are deflected, so that a characteristic that the guest changes as the host changes is presented. The guest-host effect cell 21 may only absorb polarized light, thus it is necessary to provide the polarizer 30 on the side of the guest-host effect cell 21 facing away from the display panel 10.

Specifically, since the liquid crystal molecules 213 have an anisotropy in dielectric property and an anisotropy in refractive index, an arrangement of the liquid crystal molecules 213 may be changed under the action of the electric field. The dichroic dye molecule 214 has a rod-like structure having a long axis and a short axis, and the dichroic dye molecules 214 which have a different absorption coefficient for visible light in the long-axis direction from that in the short-axis direction are used as the guest and are diffused in the liquid crystal molecules 213 which are arranged in a certain orientation and are used as the host. The dichroic dye molecules 214 will be arranged in the same orientation as the liquid crystal molecules 213 due to the guest-host effect. When the arrangement of the liquid crystal molecules 213 used as the host changes under the action of the electric field, the arranged orientation of the dichroic dye molecules 214 used as the guest also changes. As a result, the absorption of the dichroic dye molecules 214 for incident light also changes.

Figure 8:
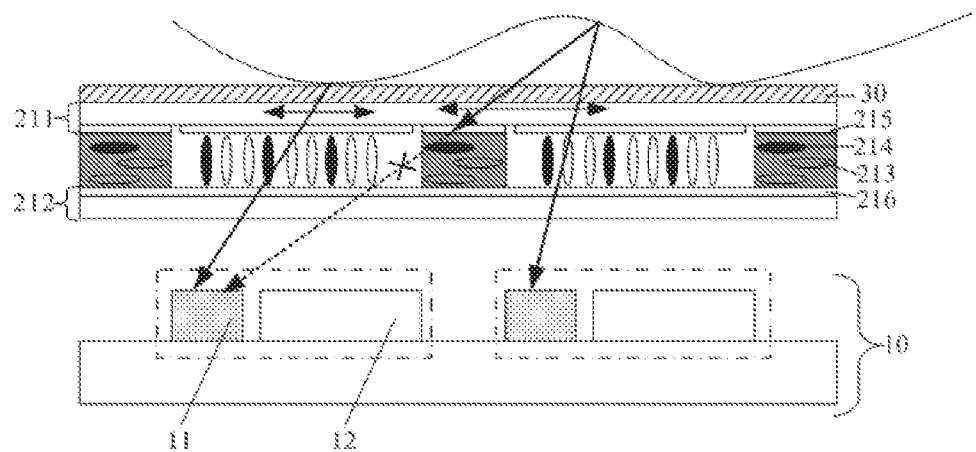
FIG. 8 is a schematic view showing bright stripes and dark stripes, which are presented in a region of the display apparatus of FIG. 7 covered by a finger, for fingerprint-reflected light.

For example, the dichroic dye molecules 214 may have a large absorption for polarized light which has a polarization direction parallel to the long-axis direction, and have a small absorption for polarized light which has a polarization direction parallel to the short-axis direction. The absorption axis of the polarizer 30 is kept unchanged. For example, in the embodiment of FIG. 8, the polarization direction of the fingerprint-reflected light passing through the polarizer 30 may be in a direction indicated by the double arrow in FIG. 8. Therefore, as shown in FIG. 8, when the long axis of the dichroic dye molecule 214 is controlled to be parallel to the polarization direction (indicated by the double arrow in FIG. 8) of the fingerprint-reflected light, the light may be substantially absorbed by the dichroic dye molecules 214. Thereby, an effect similar to the light shielding layer for the fingerprint-reflected light may be obtained. When the long axis of the dichroic dye molecule 214 is controlled to be perpendicular to the polarization direction of the fingerprint-reflected light, the fingerprint-reflected light may pass through the dichroic dye molecules 214 normally.

According to an embodiment of the present disclosure, in a region covered by the finger, by controlling a voltage between the first electrode 215 and the second electrode 216 of the guest-host effect cell 21, the deflection angle of the liquid crystal molecules 213 located therebetween is controlled, so that the dye molecules 214 may be deflected by a corresponding angle as the liquid crystal molecules 213 are deflected. By means of different arrangements of the dichroic dye molecules 214, bright (transparent) stripes and dark (light-absorbing) stripes which are alternately arranged may be formed for the fingerprint-reflected light (as shown in FIG. 8), and only a part of the fingerprint-reflected light may pass through the transparent stripes while other obliquely incident fingerprint-reflected light may be absorbed by the dark (light-absorbing) stripes, thereby preventing the mutual interference of the fingerprint-reflected light from the adjacent sub-pixels.

For example, the second electrode 216 may be provided on the second substrate 212 in a form of entire layer. The plurality of mutually insulated first electrodes 215 on the first substrate 211 are reasonably provided so as to form the bright stripes and the dark stripes for the fingerprint-reflected light under the action of the electric field. Also, the dark (light-absorbing) stripes are located between the adjacent sub-pixels, so as to avoid dark (light-absorbing) stripes from absorbing a part of the fingerprint-reflected light directly above the sub-pixel.

In one example, both the first substrate 211 and the second substrate 212 may be transparent substrates.

In one example, both the first electrode 215 and the second electrode 216 may be transparent electrodes.

Figure 9:
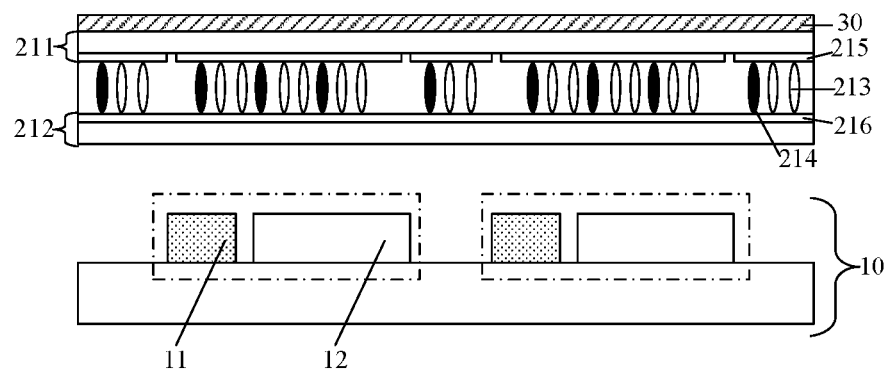
FIG. 9 is a schematic view showing a light-transmissive state presented in a region, which is not covered by the finger, of the display apparatus of FIG. 7.

Of course, when fingerprint identification is not performed, for example, in a region which is not covered by the finger, as shown in FIG. 9, it is only necessary to control the long axis of the dichroic dye molecule 214 to be perpendicular to the polarization direction of the fingerprint-reflected light, thereby not affecting the exiting light from the display panel 10.

As can be seen from the above descriptions, the guest-host effect cell 21 and the polarizer 30 are provided to mainly act on the fingerprint-reflected light without affecting the exiting light from the display panel 10. In fact, the dark (light-absorbing) stripes mentioned above are not opaque. The dark (light-absorbing) stripes merely absorb the fingerprint-reflected light, thus they are called dark stripes for the fingerprint-reflected light.

For example, the polarizer 30 may be bonded onto the guest-host effect cell 21 by an adhesive layer, and the guest-host effect cell 21 may be bonded onto the light exiting face of the display panel 10 by an adhesive layer, so as to form a display apparatus.

In the embodiment of the present disclosure, the fingerprint identification anti-interference structure 20 includes the guest-host effect cell 21 and the polarizer 30. With such an arrangement, under the action of the electric field between the first electrode 215 and the second electrode 216 of the guest-host effect cell 21, bright stripes and dark stripes for the fingerprint-reflected light are formed in the region covered by the finger, so that the light from the adjacent sub-pixels may be absorbed by the dark (light-absorbing) stripes. As a result, the light received by the photosensitive element 11 of each fingerprint identification device is substantially the light reflected by the fingerprint directly above the sub-pixel in which the photosensitive element is located.

Figure 10:
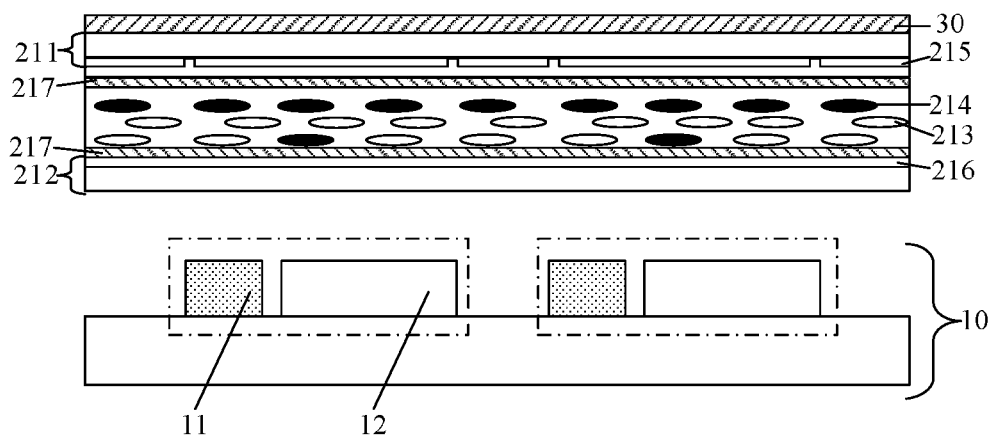
FIG. 10 is a schematic structural view of a display apparatus according to an embodiment of the present disclosure.

Further, as shown in FIG. 10, the guest-host effect cell 21 may further include alignment layers 217 disposed on opposite sides of the first substrate 211 and the second substrate 212, that is, a first alignment layer 217 disposed on a side of the first substrate 211 facing towards the second substrate 212 and a second alignment layer 217 disposed on a side of the second substrate 212 facing towards the first substrate 211.

For example, alignment orientations of the two alignment layers 217 are both perpendicular to the absorption axis of the polarizer 30, so that the polarization direction of the fingerprint-reflected light through the polarizer 30 is parallel to the orientations of the alignment layers 217. The long axis of the dye molecule 214 is parallel to the orientations of the alignment layers 217, that is, the long axis of the dye molecule 214 is parallel to the polarization direction of the fingerprint-reflected light passing through the polarizer 30. Therefore, it is possible to form the dark (light-absorbing) stripes without applying the electric field between the first electrode 215 and the second electrode 216.

In the embodiment, the display panel 10 may be a liquid crystal display panel. Since the fingerprint identification anti-interference structure 20 includes the polarizer 30 and the exiting light from the liquid crystal display panel are linearly polarized light, it is necessary to match the polarization direction of the exiting light from the liquid crystal display panel with the polarization direction of the polarizer 30, that is, it is necessary to allow the exiting light from the liquid crystal display panel pass through the polarizer 30 without affecting the normal display.

Advantageously, in the embodiment, the display panel 10 may be an OLED display panel. The exiting light from the OLED display panel is generally natural light. In this case, it is not necessary to match the exiting light from the OLED display panel with the polarization direction of the polarizer 30, thereby realizing the normal display relatively easily.

Figure 11:
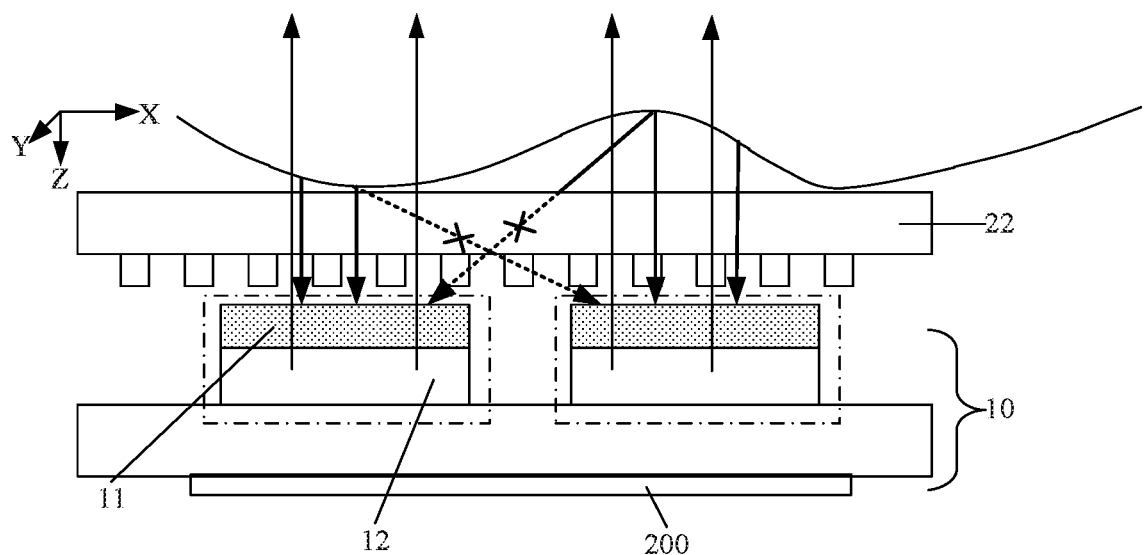
FIG. 11 is a schematic structural view of a display apparatus according to an embodiment of the present disclosure, in which the fingerprint identification anti-interference structure includes a two-dimensional photonic crystal structure.

Alternatively, as shown in FIG. 11, the fingerprint identification anti-interference structure 20 may include a first photonic crystal structure 22. The first photonic crystal structure 22 may include a two-dimensional photonic crystal, that is, it has a periodic structure that produces a non-visible photonic band gap in a first direction (e.g., X direction) and a periodic structure that produces a non-visible photonic band gap in a second direction (e.g., Y direction). For example, in the illustrated embodiment, the plane in which the X direction and the Y direction are located is parallel to the light exiting face of the display panel 10. In one example, the X direction and the Y direction may be perpendicular to each other.

In this embodiment, the photosensitive element 11 may be a non-visible light photosensitive element. In view of the fact that a part of the non-visible light has an adverse influence on the human body, it is advantageous that the photosensitive element 11 may be a photosensitive element capable of sensing infrared light. For example, the photosensitive element 11 may be an organic photosensitive element capable of sensing infrared light. The organic photosensitive element may include an upper transparent electrode, a lower transparent electrode and an organic photosensitive material layer between the upper transparent electrode and the lower transparent electrode.

Further, the display apparatus may include an infrared light source 200 that emits infrared light, as shown in FIG. 11. Optionally, the specific location of the infrared light source may be set according to specific conditions.

Advantageously, the photosensitive element 11 may include an organic photosensitive material that has good absorption in the near infrared range, and accordingly, the infrared light source 200 may be a near infrared light source.

Similar to FIG. 4, an orthographic projection of the fingerprint identification device 100 on the base substrate 102 may at least partially coincide with an orthographic projection of the display unit 12 on the base substrate 102, in particular, an orthographic projection of the photosensitive element 11 of the fingerprint identification device 100 on the base substrate 102 may at least partially coincide with an orthographic projection of the light emitting region of the display unit 12 on the base substrate 102. For example, in the illustrated embodiment, the orthographic projection of the photosensitive element 11 of the fingerprint identification device 100 on the base substrate 102 may fully coincide with the orthographic projection of the light emitting region of the display unit 12 on the base substrate 102.

It should be noted that in the case that the photosensitive element 11 of the fingerprint identification device 100 is a photosensitive element capable of sensing non-visible light, a light source for fingerprint identification may not be additionally provided in the display apparatus. For example, the photosensitive element 11 may be a photosensitive element capable of sensing infrared light, in particular, the photosensitive element 11 may sense infrared light emitted by the finger itself to perform fingerprint identification.

It can be understood that the photonic band gap of the first photonic crystal structure 22 is within the non-visible light range, thus there is no influence on the light emitted from the display panel 10 so that the normal display is not affected.

The photonic crystal is an artificially designed and fabricated crystal which may have a periodic dielectric structure on an optical scale. The photonic crystal may have a forbidden photonic band (also referred to as photonic band gap (PBG)). The photonic band gap is a frequency range, an incident light is reflected and cannot pass through the photonic crystal if a frequency of the incident light is within the frequency range. Specifically, if there is a periodic structure, in which mediums having different refractive indices are periodically arranged, in one direction, a photonic band gap will be presented in the direction. The frequency range of the photonic band gap may be set according to parameters of the corresponding periodic structure.

For example, if non-visible photonic band gaps are generated in both the X direction and the Y direction, non-visible light in a third direction (e.g., Z direction) may pass through the photonic crystal. The Z direction is perpendicular to a plane in which the X and Y directions are located. The first photonic crystal structure 22 may not have a non-visible light photonic band gap in the Z direction, or even if there is a photonic band gap in the Z direction, the photonic band gap is not within a frequency range of the non-visible light (e.g., infrared light).

It should be understood that a frequency range of the non-visible light that may be sensed by the non-visible photosensitive element 11 may correspond to a frequency range of the non-visible light that is allowed to pass through the first photonic crystal structure 22.

Figure 12A:
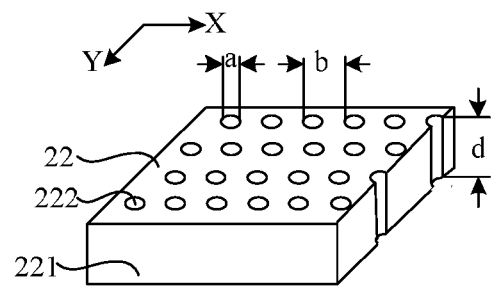
FIG. 12A is a schematic view of the two-dimensional photonic crystal structure of FIG. 11.
Figure 12B:
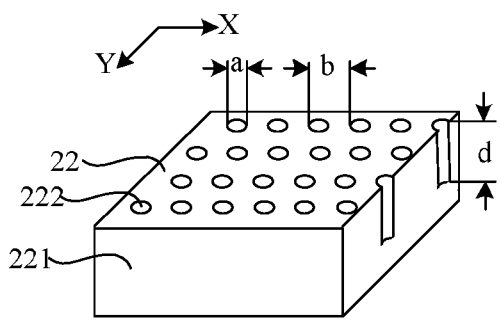
FIG. 12B is a schematic view of the two-dimensional photonic crystal structure of FIG. 11.
Figure 12C:
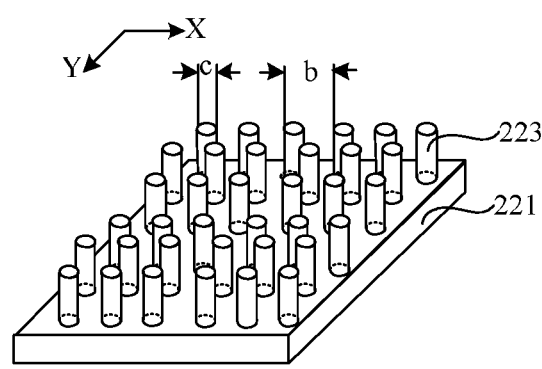
FIG. 12C is a schematic view of the two-dimensional photonic crystal structure of FIG. 11.

As shown in FIGS. 12A, 12B and 12C, the first photonic crystal structure 22 may be a two-dimensional photonic crystal structure. That is, there is no photonic band gap in the Z direction, and the non-visible photonic band gaps are only generated in both the X direction and the Y direction.

A two-dimensional photonic crystal is formed by arranging periodically two different mediums in a two-dimensional plane and arranging uniformly the mediums in a direction perpendicular to the two-dimensional plane. In the embodiment, the two-dimensional plane is a plane perpendicular to the Z direction. In the two-dimensional plane, photonic band gaps are generated in the X direction and the Y direction respectively, so that the light within the photonic band gaps cannot pass through the photonic crystal in both the X and Y directions.

It should be noted that the expression "arranging uniformly the mediums in a direction perpendicular to the two-dimensional plane" means that either one medium or another medium is present in the direction perpendicular to the two-dimensional plane and there is not a periodic structure of two mediums in the direction perpendicular to the two-dimensional plane.

As shown in FIG. 12A and FIG. 12B, the first photonic crystal structure 22 may specifically be a two-dimensional photonic crystal structure of air hole type. The air holes extend in the Z direction.

As shown in FIG. 12A, the depth d of the air hole may be equal to the thickness of the first photonic crystal structure 22, that is, the air holes extend through the first photonic crystal structure 22. Specifically, the first photonic crystal structure 22 may include a substrate 221 formed of a first medium (e.g., silicon), and a plurality of through holes 222 formed in the substrate 221, and the plurality of through holes 222 are evenly distributed in the substrate 221 in both the X direction and the Y direction. In this way, a periodic structure in which the first medium (e.g., silicon) and the second medium (air) are alternately arranged is formed in the X direction, and a periodic structure in which the first medium (e.g., silicon) and the second medium (air) are alternately arranged is formed in the Y direction.

Alternatively, as shown in FIG. 12B, the depth d of the air hole may be smaller than the thickness of the first photonic crystal structure 22. Specifically, the first photonic crystal structure 22 may include a substrate 221 formed of a first medium (e.g., silicon), and a plurality of non-through holes 222 formed in the substrate 221, and the plurality of non-through holes 222 are evenly distributed in the substrate 221 in both the X direction and the Y direction. In this way, a periodic structure in which the first medium (e.g., silicon) and the second medium (air) are alternately arranged is formed in the X direction, and a periodic structure in which the first medium (e.g., silicon) and the second medium (air) are alternately arranged is formed in the Y direction.

With regard to the two-dimensional photonic crystal structure of air hole type, it is to be understood that one of the mediums is air and the air holes are formed in another medium. Taking a silicon base as an example of another medium, in order to prepare the photonic crystal, a silicon-based film is first deposited, then the silicon-based film is exposed and etched to form periodically arranged air holes. The hole diameter a of the air hole and the pitch b of the air holes may be designed to obtain a desired photonic band gap.

Alternatively, as shown in FIG. 12C, the first photonic crystal structure 22 may be a two-dimensional photonic crystal structure of medium pillar type. The medium pillars extend in the Z direction. Specifically, the first photonic crystal structure 22 may include a substrate 221 formed of a first medium (e.g., silicon), and a plurality of medium pillars 223 formed on the substrate 221. The plurality of medium pillars 223 are evenly distributed on the substrate 221 in both the X direction and the Y direction. The medium pillars 223 may also be formed of the first medium, such as silicon. Thus, a periodic structure in which the first medium (e.g., silicon) and the second medium (air) are alternately arranged is formed in the X direction, and a periodic structure in which the first medium (e.g., silicon) and the second medium are alternately arranged is formed in the Y direction.

With regard to the two-dimensional photonic crystal structure of medium pillar type, it is to be understood that one medium is a material for forming the medium pillar and the other medium is air. Taking a silicon base as an example of the one medium, in order to prepare the photonic crystal, a silicon-based film is first deposited, then the silicon-based film is exposed and etched to form periodically arranged silicon-based medium pillars. The diameter c of the medium pillar and the pitch b of the medium pillars may be designed to obtain a desired photonic band gap.

In the embodiment of the present disclosure, the fingerprint identification anti-interference structure 20 includes the first photonic crystal structure 22 that generates a non-visible light photonic band gap in the X direction and a non-visible light photonic band gap in the Y direction, so that only a portion of the non-visible light reflected by the fingerprint in the Z direction (i.e. A Z-directional component) may pass through the first photonic crystal structure 22 to irradiate onto the photosensitive element 11. In this way, the light received by the photosensitive element 11 in each fingerprint identification device 100 is substantially light reflected by the fingerprint directly above the sub-pixel in which the photosensitive element is located.

Figure 13:
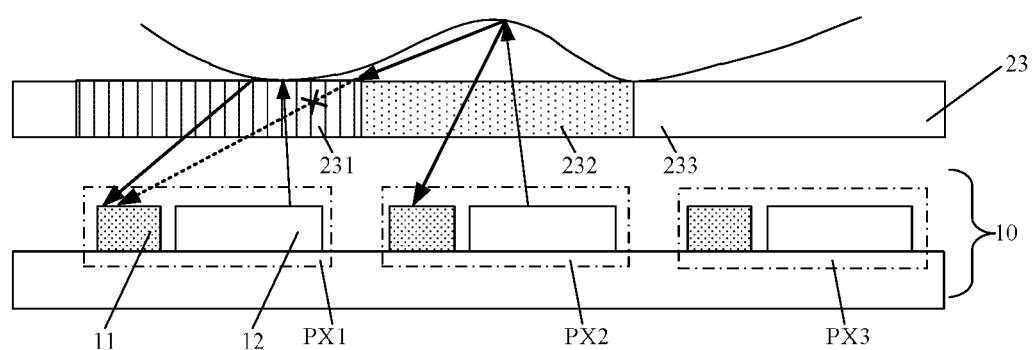
FIG. 13 is a schematic structural view of a display apparatus according to an embodiment of the present disclosure, in which the fingerprint identification anti-interference structure includes a one-dimensional photonic crystal structure.

Optionally, as shown in FIG. 13, the fingerprint identification anti-interference structure 20 may include a second photonic crystal structure 23. The second photonic crystal structure 23 may include a first photonic crystal unit 231, a second photonic crystal unit 232 and a third photonic crystal unit 233. Each of the first photonic crystal unit 231, the second photonic crystal unit 232 and the third photonic crystal unit 233 is provided with a defective layer, which will be described in detail below. The first photonic crystal unit 231 corresponds to a sub-pixel PX1 of a first color of the display panel for transmitting light of the first color, the second photonic crystal unit 232 corresponds to a sub-pixel PX2 of a second color of the display panel for transmitting light of the second color, and the third photonic crystal unit 233 corresponds to a sub-pixel PX3 of a third color of the display panel for transmitting light of the third color.

Figure 14:
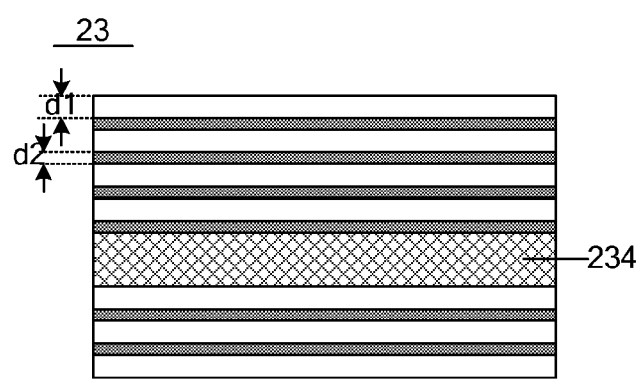
FIG. 14 is a schematic view of the one-dimensional photonic crystal structure of FIG. 13.

As shown in FIG. 14, the second photonic crystal structure 23 may have a one-dimensional photonic crystal structure. A one-dimensional photonic crystal is formed by alternately arranging two materials of different refractive indices in one direction, and has a multi-layered film structure. The one-dimensional photonic crystal has a periodic structure in only one direction, and a photonic band gap of the one-dimensional photonic crystal is presented in the one direction. Light having a frequency within the photonic band gap cannot pass through the photonic crystal in the one direction. The one-dimensional photonic crystal has a uniform structure in the other two directions. In an embodiment of the present disclosure, the two materials of different refractive indices are periodically and alternately arranged in a third direction (e.g., the Z direction), and the Z direction is perpendicular to the light exiting face of the display panel 10.

As shown, the thicknesses of the two materials of different refractive indices are d1 and d2, respectively. The pitch of the one-dimensional photonic crystal is d1+d2. The defective layer 234 is introduced into the periodic arrangement of the one-dimensional photonic crystal to destroy the translational symmetric structure. A high-intensity projection mode occurs in the photonic band gap to implement a filtering function.

Specifically, the defective layers 234 located in the first photonic crystal unit 231, the second photonic crystal unit 232 and the third photonic crystal unit 233 may be a material of the same refractive index. In this case, the defective layers 234 located in the first photonic crystal unit 231, the second photonic crystal unit 232 and the third photonic crystal unit 233 have different thicknesses. Alternatively, the defective layers 234 located in the first photonic crystal unit 231, the second photonic crystal unit 232 and the third photonic crystal unit 233 may include materials of different refractive indices.

By means of adjusting the defective layers 234 located in the first photonic crystal unit 231, the second photonic crystal unit 232 and the third photonic crystal unit 233, the first photonic crystal unit 231 may be used to transmit the light of a first color, the second photonic crystal unit 232 may be used to transmit the light of a second color, and the third photonic crystal unit 233 may be used to transmit the light of a third color. The photonic band gaps of the first photonic crystal unit 231, the second photonic crystal unit 232 and the third photonic crystal unit 233 are within the visible light range.

Figure 15:
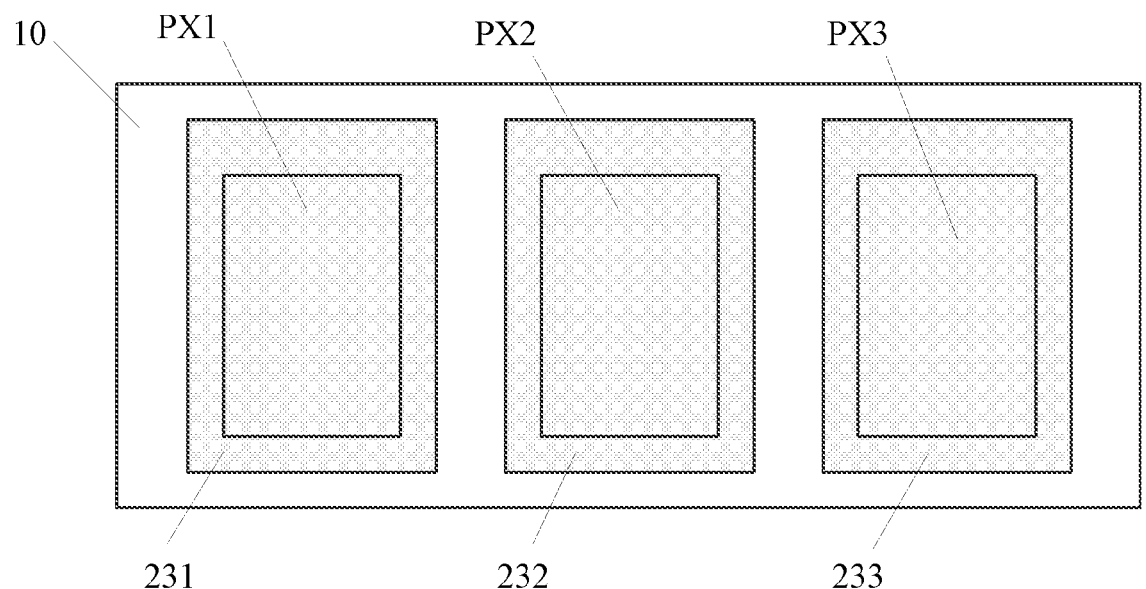
FIG. 15 is a plan view of the display apparatus of FIG. 13.

For example, the first color, the second color and the third color may be red, green and blue, respectively. As shown in FIG. 15, the display panel 10 may include a red sub-pixel PX1, a green sub-pixel PX2 and a blue sub-pixel PX3. The first photonic crystal unit 231 may be disposed above the red sub-pixel PX1, for example, an orthographic projection of the first photonic crystal unit 231 on the base substrate 102 covers an orthographic projection of the red sub-pixel PX1 on the base substrate 102. The second photonic crystal unit 232 may be disposed above the green sub-pixel PX2, for example, an orthographic projection of the second photonic crystal unit 232 on the base substrate 102 covers an orthographic projection of the green sub-pixel PX2 on the base substrate 102. The third photonic crystal unit 233 may be disposed above the blue sub-pixel PX3, for example, an orthographic projection of the third photonic crystal unit 233 on the base substrate 102 covers an orthographic projection of the blue sub-pixel PX3 on the base substrate 102.

Referring to FIG. 13 and FIG. 15, the red light emitted from the red sub-pixel PX1 is reflected by the touch body (e.g., a finger), and the fingerprint-reflected light is still red light, so that the fingerprint-reflected light can pass through the first photonic crystal unit 231, but it cannot pass through the second photonic crystal unit 232 and the third photonic crystal unit 233 which are located above the adjacent sub-pixels. The light emitted from the green sub-pixel PX2 and the light emitted from the blue sub-pixel PX3 are similar thereto. Thus, by means of the filtering function of each of the photonic crystal units 231, 232, 233, the photosensitive element 11 located in each sub-pixel may only receive the fingerprint-reflected light, which has a color corresponding to the sub-pixel where the photosensitive element 11 is located, and may not receive the fingerprint-reflected light, which has another color corresponding to an adjacent sub-pixel. In this way, the light received by the photosensitive element 11 of each fingerprint identification device 100 is substantially the light reflected by the fingerprint directly above the sub-pixel in which the photosensitive element is located.

In the illustrated embodiment, the orthographic projection of the fingerprint identification device 100 on the base substrate 102 does not coincide with the orthographic projection of the display unit 12 on the base substrate 102, in particular, the orthographic projection of the photosensitive element 11 of the fingerprint identification device 100 on the base substrate 102 does not coincide with the orthographic projection of the light emitting region of the display unit 12 on the base substrate 102. Thus, the light emitted from the display unit 12 during normal display does not directly irradiate onto the photosensitive element 11 of the fingerprint identification device 100 so that it does not interfere with the fingerprint identification function.

In the embodiment, the photosensitive element 11 may be a PIN photodiode, or an MSM photodiode.

Figure 16:
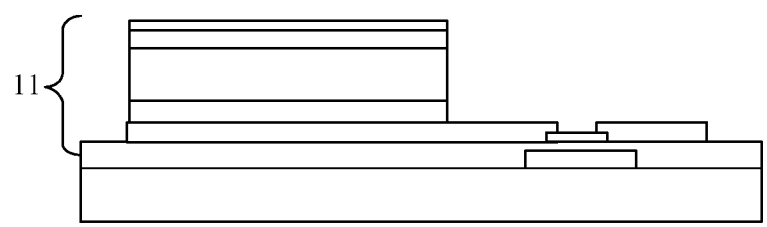
FIG. 16 is a schematic view of a fingerprint identification device according to an embodiment of the present disclosure.

Taking the PIN photodiode as an example of the photosensitive element 11, the fingerprint identification device may further include a thin film transistor. As shown in FIG. 16, the thin film transistor may be connected to the PIN photodiode. When the thin film transistor is turned on, the signal generated by the PIN photodiode may be output to the signal line. The PIN photodiode may include a lower electrode, an upper electrode, a P-type layer, an I-type layer and an N-type layer therebetween. With regard to other specific structures, reference may be made to FIG. 3, and details are not described here again.

In the display apparatus provided by the embodiment of the present disclosure, by means of providing the fingerprint identification anti-interference structure on the light exiting side of the display panel, the mutual interference of the fingerprint-reflected light from adjacent sub-pixels may be avoided. Also, the light received by each fingerprint detector may substantially be the light reflected by the fingerprint directly above the sub-pixel where the fingerprint detector is located, so as to prevent the fingerprint detector from receiving both the light reflected by the ridge and the light reflected by the valley, thereby improving the fingerprint identification accuracy.

Figure 17:
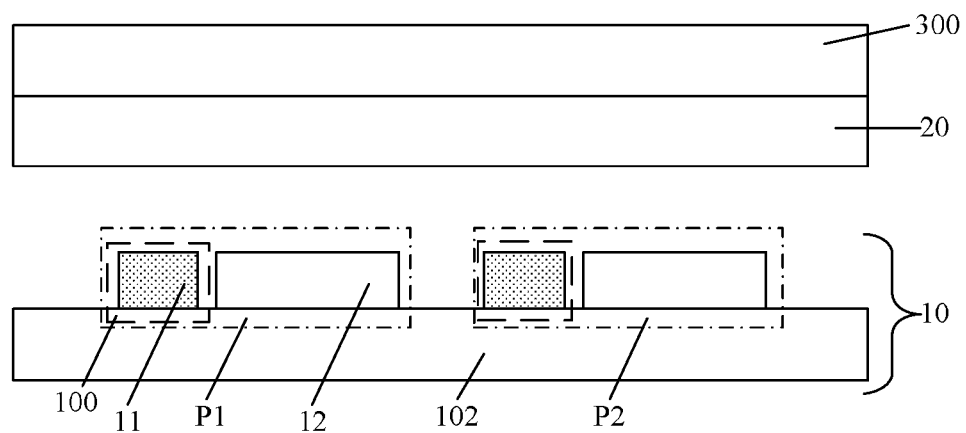
FIG. 17 is a schematic structural view of a display apparatus according to an embodiment of the present disclosure, in which the display panel includes a touch structure.

Optionally, the display apparatus may also be integrated with a touch structure. As shown in FIG. 17, the display apparatus may include: a display panel 10; a fingerprint identification device 100; a fingerprint identification anti-interference structure 20; and a touch structure 300. In this way, the display apparatus may have both a fingerprint identification function and a touch function. Moreover, in a process of performing fingerprint identification, one or more touch position may be identified by the touch structure 300 and the light at the one or more touch position may be adjusted based on the identified touch position so as to uniform the light at the one or more touch position, thereby further improving the fingerprint identification accuracy.

The above descriptions are only the specific embodiments of the present disclosure, but the scope of the present disclosure is not limited thereto, and any person skilled in the art can easily think of changes or substitutions within the technical scope of the present disclosure. These changes or substitutions should be included within the scope of the present disclosure. Therefore, the scope of the present disclosure should be defined by the claims.

What is claimed is:

1. A display apparatus comprising:
a display panel comprising a first sub-pixel and a second sub-pixel adjacent to the first sub-pixel;
a first fingerprint identification device comprising a first photosensitive element, an orthographic projection of the first photosensitive element on the display panel being located within the first sub-pixel; and
a fingerprint identification anti-interference structure on a light exiting side of the display panel,
wherein the fingerprint identification anti-interference structure is configured to shield the first photosensitive element from light emitted from the second sub-pixel and reflected by a fingerprint.

2. The display apparatus of claim 1, wherein the fingerprint identification anti-interference structure comprises a guest-host effect cell and a polarizer on a side of the guest-host effect cell facing away from the display panel, and
wherein the guest-host effect cell comprises:
a first substrate and a second substrate opposite to each other;
liquid crystal molecules between the first substrate and the second substrate;
dye molecules between the first substrate and the second substrate;
a plurality of first electrodes on the first substrate, the plurality of first electrodes being insulated from each other; and
at least one second electrode on the second substrate.

3. The display apparatus of claim 2, wherein the dye molecules are dichroic dye molecules.

4. The display apparatus of claim 2, wherein the guest-host effect cell further comprises: a first alignment layer on a side of the first substrate facing towards the second substrate; and a second alignment layer on a side of the second substrate facing towards the first substrate; and
wherein alignment directions of both the first alignment layer and the second alignment layer are perpendicular to an absorption axis of the polarizer.

5. The display apparatus of claim 1, wherein the fingerprint identification anti-interference structure comprises a first photonic crystal structure, the first photonic crystal structure having a periodic structure in which photonic band gaps are generated in both a first direction and a second direction.

6. The display apparatus of claim 5, wherein the first photonic crystal structure comprises:
a substrate formed of a first medium; and
a plurality of holes in the substrate, the plurality of holes being spaced apart and evenly distributed in the substrate in both the first direction and the second direction, the plurality of holes being filled with a second medium different from the first medium.

7. The display apparatus of claim 5, wherein the first photonic crystal structure comprises:
a substrate formed of a first medium; and
a plurality of pillars on the substrate, the plurality of pillars being spaced apart and evenly distributed on the substrate in both the first direction and the second direction, the plurality of pillars being formed of the first medium.

8. The display apparatus of claim 1, wherein the fingerprint identification anti-interference structure comprises a second photonic crystal structure, the second photonic crystal structure having a structure that allows light within a predetermined frequency range to be transmitted in a third direction.

9. The display apparatus of claim 8, wherein the second photonic crystal structure comprises a first photonic crystal unit for allowing light of a first color to be transmitted through the first photonic crystal unit, a second photonic crystal unit for allowing light of a second color to be transmitted through the second photonic crystal unit, and a third photonic crystal unit for allowing light of a third color to be transmitted through the third photonic crystal unit.

10. The display apparatus of claim 9, wherein each of the first photonic crystal unit, the second photonic crystal unit and the third photonic crystal unit comprises:
 a first portion having a first material layer and a second material layer alternately arranged in the third direction, the first material layer and the second material layer having different refractive indices;
 a second portion having a first material layer and a second material layer alternately arranged in the third direction; and
 a defective layer between the first portion and the second portion.

11. The display apparatus of claim 10, wherein thicknesses of the defective layer of the first photonic crystal unit, the defective layer of the second photonic crystal unit and the defective layer of the third photonic crystal unit are different from each other; or
 refractive indices of the defective layer of the first photonic crystal unit, the defective layer of the second photonic crystal unit and the defective layer of the third photonic crystal unit are different from each other.

12. The display apparatus of claim 9, wherein the display panel further comprises a third sub-pixel adjacent to the first sub-pixel, the first sub-pixel emitting light of the first color, the second sub-pixel emitting light of the second color, and the third sub-pixel emitting light of the third color, and
 wherein an orthographic projection of the first photonic crystal unit on the display panel at least partially coincides with the first sub-pixel, an orthographic projection of the second photonic crystal unit on the display panel at least partially coincides with the second sub-pixel, and an orthographic projection of the third photonic crystal unit on the display panel at least partially coincides with the third sub-pixel.

13. The display apparatus of claim 1, wherein the first photosensitive element is configured to sense visible light, and the orthographic projection of the first photosensitive element on the display panel does not coincide with a light emitting region of the first sub-pixel.

14. The display apparatus of claim 1, wherein the first photosensitive element is configured to sense non-visible light, and the orthographic projection of the first photosensitive element on the display panel at least partially coincides with a light emitting region of the first sub-pixel.

15. The display apparatus of claim 5, wherein the first photosensitive element is configured to sense non-visible light, and the orthographic projection of the first photosensitive element on the display panel at least partially coincides with a light emitting region of the first sub-pixel on the display panel.

16. The display apparatus of claim 12 further comprising:
 a second fingerprint identification device comprising a second photosensitive element, an orthographic projection of the second photosensitive element on the display panel being located within the second sub-pixel; and
 a third fingerprint identification device comprising a third photosensitive element, an orthographic projection of the third photosensitive element on the display panel being located within the third sub-pixel,
 wherein the first photosensitive element is configured to sense light of the first color, the second photosensitive element is configured to sense light of the second color, and the third photosensitive element is configured to sense light of the third color.

17. The display apparatus of claim 1, wherein the first photosensitive element comprises a photodiode, and the fingerprint identification device further comprises a thin film transistor configured to read a signal generated by the photodiode.

18. The display apparatus of claim 1, wherein the first fingerprint identification device is located on the display panel or on the fingerprint identification anti-interference structure.

19. The display apparatus of claim 1, wherein the display panel is an OLED display panel.

20. The display apparatus of claim 1 further comprising: a touch structure on the light exiting side of the display panel.

* * * * *